United States Patent [19]
Patterson

[11] Patent Number: 5,790,661
[45] Date of Patent: Aug. 4, 1998

[54] MOUNT PLATE FOR THE CRADLE OF A TELEPHONE

[75] Inventor: Gregory S. Patterson, Morrisville, N.C.

[73] Assignee: Ericsson Inc., Research Triangle Park, N.C.

[21] Appl. No.: 715,474

[22] Filed: Sep. 18, 1996

[51] Int. Cl.⁶ ........................................... H04M 1/00
[52] U.S. Cl. ................................. 379/446; 379/455
[58] Field of Search ............................ 379/426, 435, 379/436, 455, 454, 446; 248/221.12, 221.14, 222.41, 223.41, 224.8; 455/90, 347, 569

[56] References Cited

U.S. PATENT DOCUMENTS 2,107,885  2/1938  Caggiano ................. 248/223.41
4,226,394  10/1980  Einhorn .................. 248/223.41
4,944,416  7/1990  Peterson et al. .......... 248/223.41

*Primary Examiner*—Jack Chiang
*Attorney, Agent, or Firm*—Nixon & Vanderhye

[57] ABSTRACT

A mount plate for the cradle of a telephone has a forward and upwardly inclined projecting boss with a concave surface through which a traverse slot is provided. An enlarged access opening is provided in the traverse slot for receiving a nut loosely secured on a bolt passing through the cradle. By sliding the nut and bolt from the access opening along the slot, a cam surface of the traverse slot automatically rotates the nut into proper orientation to hold it between constraining rails along the underside of the slot enabling tightening of the bolt relative to the nut. The access opening is sized and configured such that the nut can be received through the opening. Once rotated into the tightening position, the nut can also be tightened in underlying relation to the opening, affording a substantial range of movement of the cradle along the traverse slot.

15 Claims, 3 Drawing Sheets

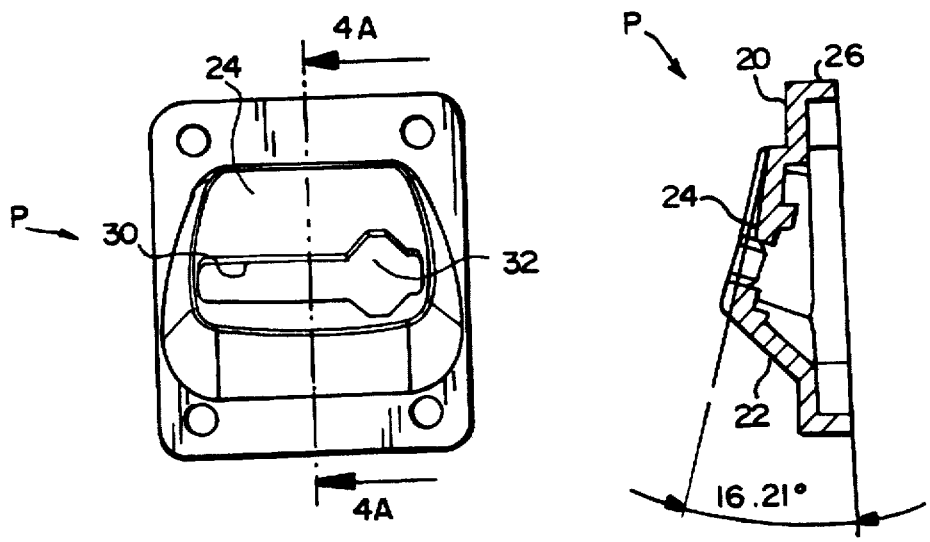
FIG. 3
FIG. 4
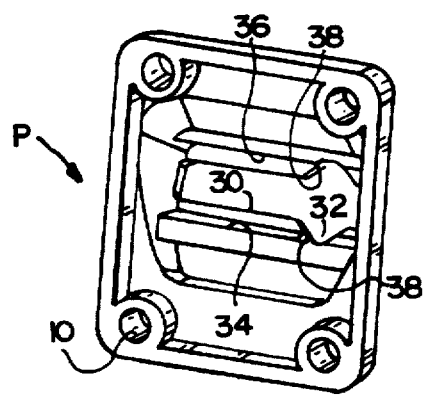
FIG. 5

MOUNT PLATE FOR THE CRADLE OF A TELEPHONE

TECHNICAL FIELD

The present invention relates to a mount plate for the cradle for a telephone and particularly to a mount plate for increasing the range of orientation of the cradle and, hence, the telephone carried by the cradle, as well as enabling securement of the cradle to the mount plate after the mount plate has been secured to a supporting surface.

BACKGROUND

The cellular phone has many accessories which are offered to enhance its performance, provide the user with the ability to personalize the phone for his or her own particular needs and/or provide the user with products that enhance the operational safety of the phone. One such accessory is known as the vehicle cradle or car cradle. The car cradle accessory performs many functions, including as a holder to secure the phone in the car. It may also provide access to external power and facilitate charging the phone while held in the cradle. The car cradle also provides means for connecting to an external microphone, external speaker and external control software to enable the phone to operate in a hands-free mode. This, of course, improves car safety by allowing the user of the phone to maintain both hands on the steering wheel while conducting a telephone conversation.

Mechanically, the car cradle takes many different forms and shapes dependent upon the phone that it is designed to accommodate. In addition, cradles generally provide some magnitude of orientation capability to allow the phone to be situated in a position enabling a driver to readily and easily use the phone. Regardless of the cradle geometry, there is typically a mount plate which interfaces the cradle to a universal standard 4-hole mount pattern, while allowing the cradle to be freely oriented and secured in a predetermined orientation.

One prior mount plate for a phone required a flat profile to ensure that the holder nut, along the back side of the mount plate, would be maintained in the proper position after the mount plate had been installed. In that installation, the front face of the mount plate comprised a concave surface having a slot through which a bolt would pass, securing the cradle to the nut on the opposite or back side of the slot. The nut necessarily had to be trapped between the mount plate and the surface on which the mount plate was secured. This allowed the bolt that secures the cradle to the mount plate to gain access to and be able to thread onto the nut after installation of the mount plate if there was no access opening enabling the nut to be inserted within the mount plate after the mount plate had been secured to the mounting surface. As a consequence, the range of motion that the cradle could be moved in that particular mount was seriously limited due to the required "flatness" necessary to trap the nut between the mount plate and the mounting surface. It was also not possible to mount the mount plate to surfaces which were discontinuous or not flat because the nut could not be trapped into the appropriate position. The nut typically would fall out of position or not be able to be reached by the bolt for attaching the cradle to the mount plate after the mount plate was secured to the mounting surface.

DESCRIPTION OF THE INVENTION

In accordance with the present invention, there is provided a mount plate geometry which improves the orientation range of the cradle for mounting the phone, as well as incorporates in the mount plate constraints such that a portion of the fastener, e.g., a nut, ultimately in final securement located within the mount plate, may be installed after the mount plate has been secured to the mounting surface. The present invention, therefore, includes a mount plate having a front face in part formed by an upwardly inclined projecting boss having a concave face portion in which is formed a fastener traverse slot. The traverse slot has a predetermined width and includes an enlarged access opening for receiving a portion, e.g., a nut, of a fastener. On the reverse side of the front face portion, there are provided a pair of constraining rails which straddle the traverse slot. Also provided are cam surfaces at the juncture of the access opening and the slot. The purpose of each cam surface is to enable the fastener portion, e.g., a nut, inserted through the access opening after installation of the mount plate to the mounting surface, to orient to a predetermined orientation whereby the fastener can finally secure the cradle to the mount plate in cooperation with another fastening portion, e.g., a bolt.

The cradle has a rear face portion comprised of a projecting boss having a convex surface generally complementary to the concave surface of the mount plate. The convex cradle surface includes an elongated slot for receiving the fastening portion, e.g., the bolt.

To install the cradle and mount plate, the mount plate is initially installed on a mounting surface by conventional means, for example, by screws or bolts passing through four standard hole sizes arranged in a predetermined pattern. In a preferred embodiment, the bolt is then passed through the slot in the cradle and the nut is loosely threaded on the end of the bolt. The nut and a portion of the bolt are then passed through the access opening and displaced laterally in either direction along the traverse slot toward a final secured position. When the bolt and nut are displaced from the access opening along the slot, the nut engages one of the cam surfaces and is thereby automatically rotated into proper orientation between the constraining rails for subsequent tightening. Further displacement of the nut and bolt combination along the slot in either direction permits the bolt to be tightened over the nut once the nut has obtained a selected position along the traverse slot.

A feature of the present invention resides in shaping and sizing the access opening to enable a first fastener portion, e.g., the nut, to be installed after the mount plate is secured to the mounting surface. Also, it is desirable to allow the nut to be tightened over the access opening after the nut has been rotated into proper position. For example, the access opening for a square nut having slightly rounded corners may have a generally diamond shape slightly larger in dimensions than the nut with similarly rounded corners and rotated or oriented 45° relative to the traverse slot. Consequently, once the nut is oriented into final tightening position, the fastener, e.g., nut and bolt, may be returned to a position in registration with the access opening and tightened over the access opening, effectively increasing the range of travel of the nut along the slot and hence increasing the range of orientation of the cradle relative to the mount plate. Other types of nuts, e.g., a hex nut, can be used with the access opening shaped and oriented similarly as the hex nut but rotated, for example, 22.5°.

It will therefore be appreciated from the foregoing that the cradle can be mounted to the mount plate after the mount plate has been secured to the mounting surface. The fastener nut does not interfere or confine the bolt/nut travel along the desired slot nor is the nut visible from outside after the assembly. Additionally, the mount plate of the present invention automatically orients the nut into the proper orientation for tightening after insertion into the mount plate. The range of orientation of the cradle is also improved by providing the traverse slot along an upwardly inclined boss having a concave face for receiving the convex surface of the cradle.

In a preferred embodiment according to the present invention, there is provided a mount for a telephone cradle, comprising a mount plate for securement to an underlying mounting surface having a front face, the front face having an elongated fastener traverse slot including an access opening for receiving first and second portions of a fastener, a constraining element along the slot spaced from the access opening for engagement by a first portion of the fastener in a predetermined orientation thereof and maintaining such orientation as the fastener is displaced along the slot and a cam surface adjacent the access opening and engageable by the first portion of the fastener to orient the first fastener portion in the predetermined orientation in response to displacement of the fastener from the access opening and along the slot.

In a further preferred embodiment according to the present invention, there is provided a mount for a telephone cradle, comprising a mount plate for securement to an underlying mounting surface having a front face, the front face having an upwardly inclined face portion containing a concave surface, an elongated fastener traverse slot including an access opening in the concave surface, the slot extending in a linear direction and having a predetermined width, the access opening having a lateral extent in excess of the predetermined width, a nut and a bolt, the nut and a portion of the bolt with the nut loosely threaded thereon being received in the access opening from a front side of the mount plate, a constraining element along the slot spaced from the access opening for engagement by the nut in a predetermined orientation thereof and maintaining such orientation as the nut is displaced along the slot and a cam surface adjacent the access opening and engageable by the nut to rotate the nut relative to the bolt into the predetermined orientation in response to displacement of the nut and bolt from the access opening along the slot.

Accordingly, it is a primary object of the present invention to provide a novel and improved mount plate for the cradle of a telephone which enables an increased range of orientation of the cradle relative to the mount plate, installation of the cradle after the mount plate is secured to the mounting surface, permits a fastening portion to be inserted into the mount plate after the mount plate has been secured and automatically orients the fastening portion into proper position for securement.

BRIEF DESCRIPTION OF THE DRAWINGS

FIG. 3 is a front elevational view of the mount plate;

FIG. 4 is a cross-sectional view thereof taken generally about on line 4—4 in FIG. 3;

FIG. 5 is a perspective view of the reverse side of the mount plate;

BEST MODE FOR CARRYING OUT THE INVENTION

Figure 1:
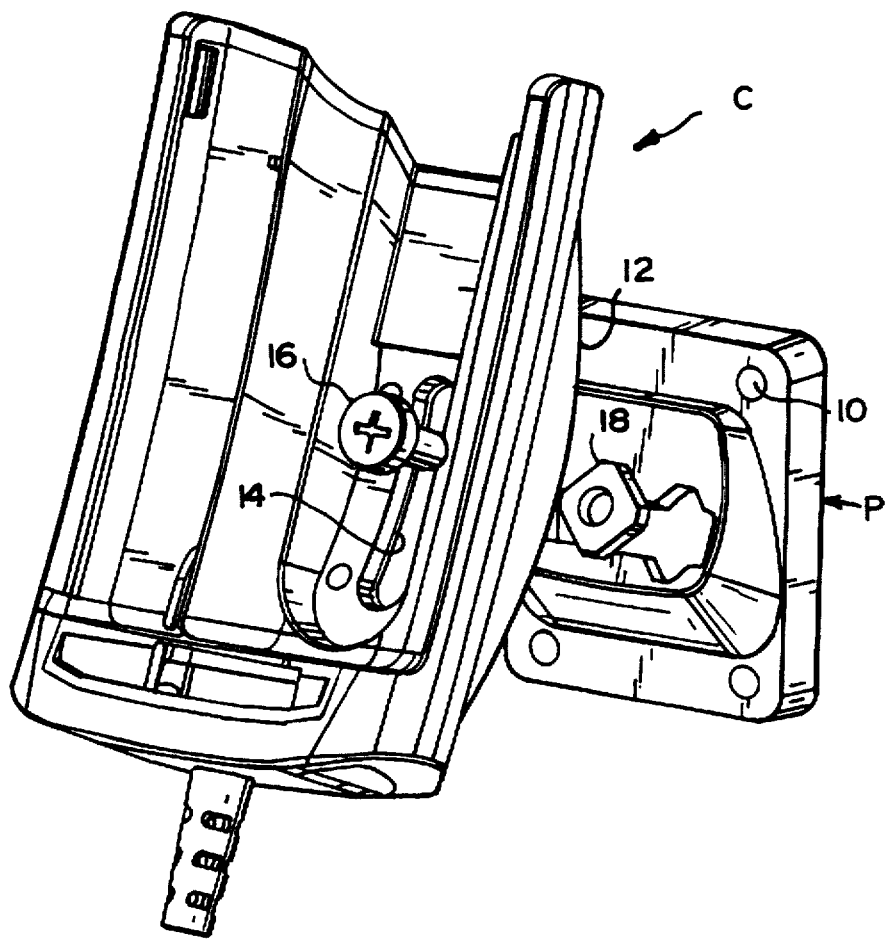
FIG. 1 is an exploded perspective view illustrating a telephone cradle and a mount plate with parts illustrated prior to assembly.

Referring now to FIG. 1, there is illustrated a cradle, generally designated C, and a mount plate, generally designated P, by which the cradle is secured to a mounting surface, not shown. The mounting surface may comprise a continuous or discontinuous flat or irregular surface, for example, part of the console of an automobile. The mount plate P interfaces the cradle C to a universal standard 4-hole mount pattern, the holes being indicated 10, allowing the cradle to be freely oriented relative to the mount plate P. Thus, screws, not shown, may be employed to mount the plate P to the mounting surface. The cradle C comprises a conventional cradle for receiving a telephone and which cradle may provide power to and charge the phone while in the cradle, as well as provide for connections to an external microphone, speaker and controls and the like. Except for the connection between the cradle and the mount plate, the cradle forms no part of the present invention. It will be appreciated, however, that the cradle has a rear projection in the form of a boss having a convex surface 12 which is complementary to a concave surface of the mount plate P, as described hereafter. A slot 14 extends through the convex surface for receiving a fastener 16, the preferred form of which is a bolt for cooperation with a nut 18 for securing the cradle and the mount plate one to the other.

Figure 2:
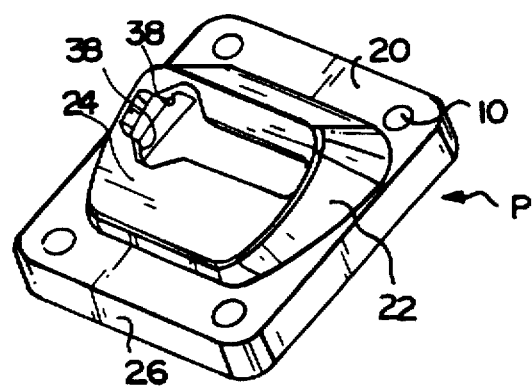
FIG. 2 is a perspective view of the mount plate.

Referring now to FIGS. 2–4, the mount plate P includes a forward or front face 20 having a boss 22 projecting forwardly and inclined upwardly from the front face 20, terminating in a generally concave surface 24. The plate 20 also includes marginal flanges 26 which project in the opposite direction from front face 20, i.e., rearwardly, for bearing against a mounting surface, not shown. Consequently, it will be appreciated that the mount plate P can be secured to the mounting surface by bolts or screws passing through the openings 10 with the margins 26 lying flush along the mounting surface, precluding access to the interior portion of the plate P. As best illustrated in FIG. 4, the boss 22 projects to a greater extent from the front face 20 along the lower portion of mount plate P than along the upper portion whereby the concave surface 24 is oriented in a generally upwardly facing or upwardly inclined direction.

Disposed along the concave surface 24 is a fastener traverse slot 30 including an enlarged access opening 32. The slot 30 extends crosswise or transversely of the concave surface 24 and has a predetermined width. The enlarged access opening 32 is preferably disposed intermediate the ends of slot 30, its lateral dimension being in excess of the width of the slot 30. It will be appreciated, however, that the access opening may be provided at any location along the slot. As best illustrated in FIGS. 4 and 5, guide rails 34 and 36 are disposed along the inside face of concave surface 24 on opposite sides of, i.e., straddle, slot 30. Rails 34 and 36 thus constrain the fastener, e.g., a nut, from rotation when the cradle is secured to the plate P. Rails 34 and 36 also extend to both sides of the opening 32 such that the nut can be displaced to both sides of opening 32 as described below.

As seen from a review of FIGS. 3 and 5, the enlarged access opening 32 is multi-sided and, in a preferred form for use with a generally square fastener nut 18 as illustrated in these drawing figures, is generally diamond-shaped. The access opening 32 is sized relative to a portion of the fastener, e.g., nut 18, such that the nut may be disposed through the enlarged opening 32 in a certain orientation of the nut relative to the opening. That is, the nut in one orientation generally corresponding to the outline of the opening 32 and when attached to the bolt 16, as described below, is freely passed through the access opening 32. However, in other orientations, the nut may engage the sides of the opening 32, e.g., when the sides of the nut lie parallel to the constraining rails 34 and 36. As illustrated in FIG. 5, surfaces 38, i.e., cam surfaces, are formed adjacent the opening 32 on opposite sides thereof and the slot 30. The cam surfaces 38 lie inwardly of the access opening 32 for respective engagement by the nut 18 upon sliding movement of the nut in either direction along the traverse slot 30. That is, the nut 18 engages a cam surface 38 upon insertion of the nut through the access opening and movement thereof in either direction along the slot to automatically rotate the nut relative to the bolt and mount plate P to an orientation for sliding movement between the rails 34 and 36 with the nut engaging against the rails. In that latter orientation, it will be appreciated that the nut cannot be rotated by its engagement with the rails and hence bolt 16 may be tightened.

The access opening 32 is particularly designed based on the size and geometry of the fastener, e.g., nut, being used to install the cradle on the mount plate. For example, where a square nut is employed, the square nut should have rounded corners. Thus, for example, a nut measuring 10 mm by 10 mm may have a 3.0 mm chamfer to create rounded corners. To accommodate a nut of that size, the access opening is made 10.5 mm by 10.5 mm with a 2.25 mm chamfer to allow the nut to pass through the opening. The access opening is essentially similarly shaped as the nut, except that it is larger and rotated 45° from the position that the nut will lie when tightened into final assembly. This rotation of the access opening enables the nut when oriented in the final tightening position and returned in registration with opening 32 to be tightened over opening 32, thus increasing the effective range of travel the nut can make in the slot and hence further increasing the range of orientation of the cradle relative to the mount plate.

Figure 6A:
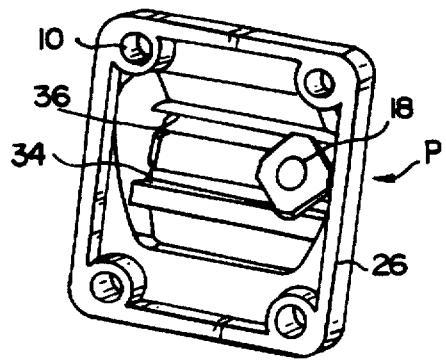
FIGS. 6A–6C are perspective views from the back side of the mount plate illustrating the cooperation between the fastening portion and the cam of the mount plate for orienting the fastening portion.
Figure 6B:
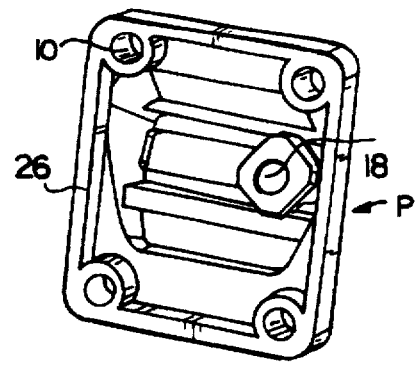
Figure 6C:
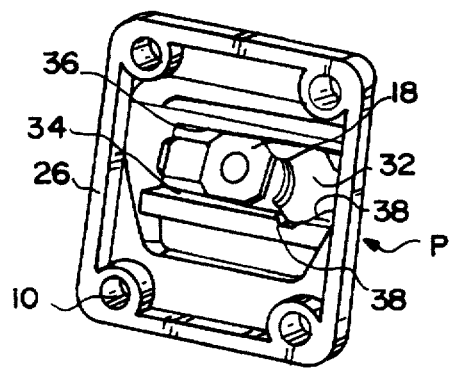

To install the cradle on the mount plate P, the mount plate P is first secured onto a mounting surface, for example, by bolts or screws, passed through the openings 10 of plate P. The fastener, i.e., the bolt, is inserted through the slot 14 of the cradle C and the nut 18 may be loosely secured onto the section of the bolt extending out the other side of the cradle. As illustrated in FIG. 6A, the nut, loosely attached to the bolt, may be passed through the access opening 32 of the mount plate P. Upon sliding the nut and bolt away from the access opening in either direction along the traverse slot 30, the nut will engage a cam surface 38 which will automatically rotate the nut relative to the bolt into the proper position for alignment between the constraining rails 34 and 36, as illustrated upon comparison of FIGS. 6B and 6C. By sliding the nut along the traverse slot in the proper orientation in the mount plate, the proper orientation of the cradle relative to the mount plate can be obtained. The bolt may then be tightened to secure the cradle into the desired location. It will be appreciated that the size and configuration of the access opening 32 is such that once the nut has been rotated to its proper orientation, i.e., having sides parallel to the rails 34 and 36, the nut can be returned to underlie the access opening and still be tightened over that opening. That is, because the width of the flat sides of the nut is greater than the distance between the cam surfaces 38 on opposite sides of the opening 32, the nut, after being oriented by a surface 38 and rails 34 and 36, will be constrained from rotation when aligned with opening 32. This increases the effective range of travel that the nut can make in the traverse slot.

Figure 7A:
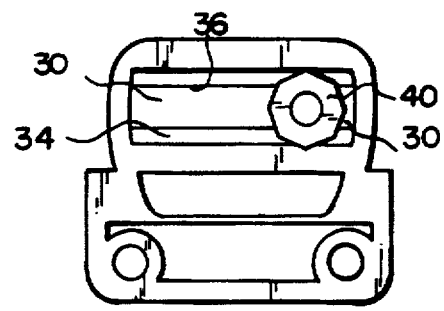
FIGS. 7A–7C are views similar to FIGS. 6A–6C illustrating a second form of fastener.
Figure 7B:
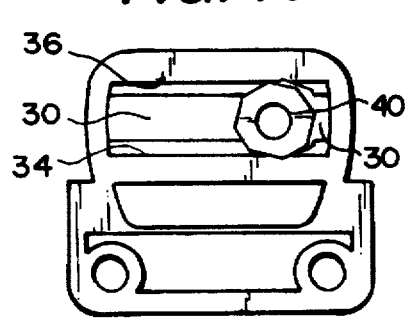
Figure 7C:
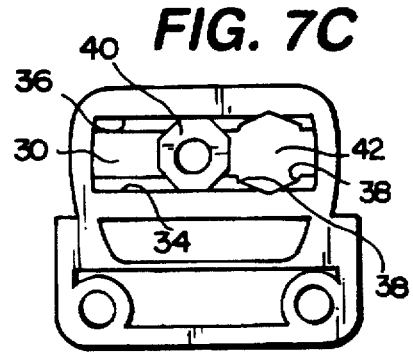

It will be also appreciated that other configurations of fasteners may be employed. For example, a hex nut 40 may be utilized as illustrated in FIGS. 7A–7C. When using a hex nut, the opening is slightly enlarged and of corresponding shape. Thus, for a 10 mm hex nut, the opening 42 along traverse slot 30 is 10.5 mm. However, instead of a 45° rotation of the access opening, it may take the shape of a hex nut rotated 22.5°. Thus, the edge of the hex nut 40 contacts the cam surface 38 to either side of opening 42 at the juncture of the access opening 42 and the constraining rails 34, 36 and forces the hex nut to rotate into the proper orientation for tightening when the nut is moved along the slot. If that orientation requires the nut to underlie the access opening, the bolt and nut may be displaced along the slot to the access opening and still be tightened.

It will be appreciated from the foregoing that the objects of the present invention have been clearly met in that the nut of the fastener can be inserted into the mount plate after the mount plate has been secured to the mounting surface. Further, the fastener is not visible externally of the assembly and the nut is automatically oriented into proper position for tightening after insertion into the mount plate. Additionally, a substantial range of movement of the cradle relative to the mount plate is afforded.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A mount for a telephone cradle comprising:
   a mount plate for securement to an underlying mounting surface and having a front face;
   said front face having an elongated fastener traverse slot including an access opening for receiving first and second portions of a fastener, said first and second portions being rotatable relative to one another about an axis;
   said access opening and said first fastener portion having edge configurations enabling said first fastener portion for reception through said access opening in at least one angular orientation of said first fastener portion about said axis relative to said access opening and precluding reception of said first fastener portion through said access opening in other angular orientations of said first fastener portion about said axis relative to said access opening;
   a constraining element along said slot spaced from said access opening for engagement by said first fastener portion in a predetermined angular orientation about said axis other than said one angular orientation and maintaining such predetermined angular orientation as the fastener is displaced along the slot; and
   a cam surface adjacent said access opening and engageable by said first fastener portion to displace said first fastener portion about said axis from said one angular orientation into said predetermined orientation in response to displacement of the fastener from the access opening along the slot.

2. A mount according to claim 1 wherein said constraining element lies within said mount plate on a side thereof remote from said front face.

3. A mount according to claim 1 wherein said constraining element comprises rails formed along an inside face of the mount plate remote from the front face and on opposite sides of said slot.

4. A mount according to claim 1 wherein said slot extends in a linear direction and has a predetermined width, said access opening having a lateral extent in excess of said predetermined width for receiving the first portion of the fastener.

5. A mount according to claim 1 in combination with said fastener, said fastener including a bolt and a nut, said nut constituting said first portion and receivable through said access opening in said one angular orientation thereof and engageable with said cam surface for rotation relative to the bolt into said predetermined orientation in response to displacement of said fastener from the access opening along said slot.

6. A mount according to claim 1 wherein the mount plate includes a boss carrying a portion of said front face, said front face portion containing said slot and extending at an acute angle relative to said front face.

7. A mount for a telephone cradle, comprising:

a mount plate for securement to an underlying mounting surface and having a front face;

said front face having an elongated fastener traverse slot including an access opening for receiving first and second portions of a fastener;

a constraining element along said slot spaced from said access opening for engagement by a first portion of the fastener in a predetermined orientation thereof and maintaining such orientation as the fastener is displaced along the slot;

a cam surface adjacent said access opening and engageable by the first portion of the fastener to orient the first fastener portion in said predetermined orientation in response to displacement of the fastener from the access opening and along the slot;

said mount plate including a boss carrying a portion of said front face, said front face portion containing said slot and extending at an acute angle relative to said front face;

said front face portion including a concave recess containing said slot.

8. A mount according to claim 7 in combination with said cradle, said cradle having a convex portion generally complementary in shape to said concave portion of said mount plate and a slot in said convex portion of said cradle for receiving the second portion of the fastener.

9. A mount according to claim 7 in combination with said fastener, said fastener including a bolt and a nut, said nut constituting said first portion, said bolt being receivable through the slot in said convex portion and the traverse slot in said concave portion with said nut being receivable through said access opening and engageable with the cam surface for rotation relative to the bolt in response to displacement of the bolt from the access opening along said traverse slot.

10. A mount for a telephone cradle, comprising:

a mount plate for securement to an underlying mounting surface having a front face;

said front face having an upwardly inclined face portion containing a concave surface, an elongated fastener traverse slot including an access opening in said concave surface, said slot extending in a linear direction and having a predetermined width, said access opening having a lateral extent in excess of said predetermined width;

a nut and a bolt, said nut and a portion of said bolt with said nut loosely threaded thereon being received in said access opening from a front side of said mount plate;

a constraining element along said slot spaced from said access opening for engagement by said nut in a predetermined orientation thereof and maintaining such orientation as the nut is displaced along the slot; and a cam surface adjacent said access opening and engageable by said nut to rotate said nut relative to said bolt into said predetermined orientation in response to displacement of the nut and bolt from the access opening along the slot.

11. A mount according to claim 10 wherein said constraining element lies within said mount plate on a side thereof remote from said front face.

12. A mount according to claim 10 wherein said constraining element comprises rails formed along an inside face of the mount plate remote from the front face and on respective opposite sides of said slot.

13. A mount according to claim 10 wherein said slot extends in a linear direction and has a predetermined width, said access opening having a lateral extent in excess of said predetermined width for receiving the first portion of the fastener.

14. A mount according to claim 10 in combination with said cradle, said cradle having a convex portion generally complementary in shape to said concave portion of said mount plate and a slot in said convex portion of said cradle for receiving said bolt.

15. A mount according to claim 10 including a second cam surface spaced along said slot and on an opposite side of said access opening from the first mentioned cam surface, the width of a flat side of the nut being greater than the distance between the cam surfaces along said slot.

* * * * *